United States Patent
Lin et al.

(10) Patent No.: US 10,757,738 B2
(45) Date of Patent: Aug. 25, 2020

(54) ON-DEMAND SYSTEM INFORMATION REQUEST MESSAGE

(71) Applicant: MEDIATEK INC., Hsinchu (TW)

(72) Inventors: Guan-Yu Lin, Hsinchu (TW); Chia-Chun Hsu, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/933,374

(22) Filed: Mar. 23, 2018

(65) Prior Publication Data
US 2018/0279377 A1    Sep. 27, 2018

Related U.S. Application Data

(60) Provisional application No. 62/475,990, filed on Mar. 24, 2017.

(51) Int. Cl.
| | |
|---|---|
| H04W 48/14 | (2009.01) |
| H04W 74/08 | (2009.01) |
| H04L 5/00 | (2006.01) |
| H04W 72/04 | (2009.01) |
| H04W 88/02 | (2009.01) |

(Continued)

(52) U.S. Cl.
CPC ....... *H04W 74/0833* (2013.01); *H04L 5/0055* (2013.01); *H04W 48/14* (2013.01); *H04W 72/0406* (2013.01); *H04W 88/023* (2013.01); *H04W 88/10* (2013.01); *H04W 74/002* (2013.01)

(58) Field of Classification Search
CPC ......... H04W 74/0833; H04W 72/0406; H04W 74/002
See application file for complete search history.

(56) References Cited

U.S. PATENT DOCUMENTS

| | | | |
|---|---|---|---|
| 2009/0196244 A1 | 8/2009 | Chun et al. | 370/329 |
| 2015/0003394 A1* | 1/2015 | Ono | H04W 72/042 |
| | | | 370/329 |
| 2017/0311285 A1* | 10/2017 | Ly | H04W 72/005 |

(Continued)

FOREIGN PATENT DOCUMENTS

CN    101945479 A    1/2008

OTHER PUBLICATIONS

International Search Report and Written Opinion of International Search Authority for PCT/CN2018/080413 dated Jun. 4, 2018 (9 pages).

*Primary Examiner* — Kodzovi Acolatse
(74) *Attorney, Agent, or Firm* — Imperium Patent Works; Zheng Jin; Helen Mao

(57) ABSTRACT

Apparatus and methods are provided for on-demand SI request procedure. In one novel aspect, the RACH procedure is used for one-demand SI information updates through unicast. In one embodiment, the UE sends an embedded SI request message in Msg3 requesting one or more on-demand SI including a UE ID. The SI response and the information of the requested SI are included in the Msg4 or in a separate unicasted message. In another embodiment, one or more assistant information is included in Msg3 or are associated with the preamble in Msg1. In another novel aspect, the preamble of the Msg1 is associated with a group X of SIB. Upon detecting the failure of transmission of the SI request, the UE monitors and receives updated SI information of the whole group X through a broadcast channel.

20 Claims, 9 Drawing Sheets

(51) Int. Cl.
*H04W 88/10* (2009.01)
*H04W 74/00* (2009.01)

(56) References Cited

U.S. PATENT DOCUMENTS

| | | | |
|---|---|---|---|
| 2018/0103465 A1* | 4/2018 | Agiwal | H04W 72/0413 |
| 2018/0124601 A1* | 5/2018 | Vutukuri | H04W 12/06 |
| 2018/0132168 A1* | 5/2018 | Ingale | H04W 48/12 |
| 2018/0167918 A1* | 6/2018 | Ishii | H04W 72/042 |
| 2018/0220288 A1* | 8/2018 | Agiwal | H04W 8/24 |
| 2019/0174554 A1* | 6/2019 | Deenoo | H04W 80/02 |
| 2019/0281440 A1* | 9/2019 | Ly | H04W 8/08 |

* cited by examiner

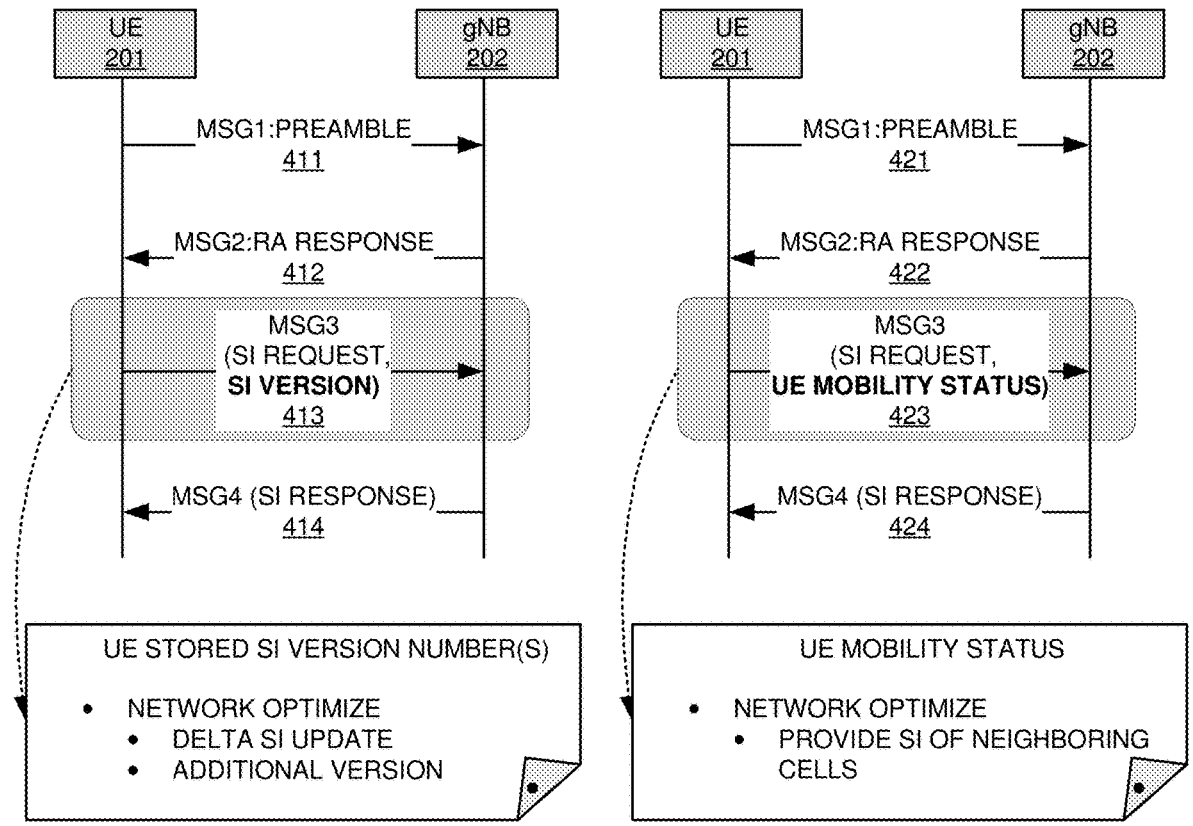
FIG. 4A
FIG. 4B
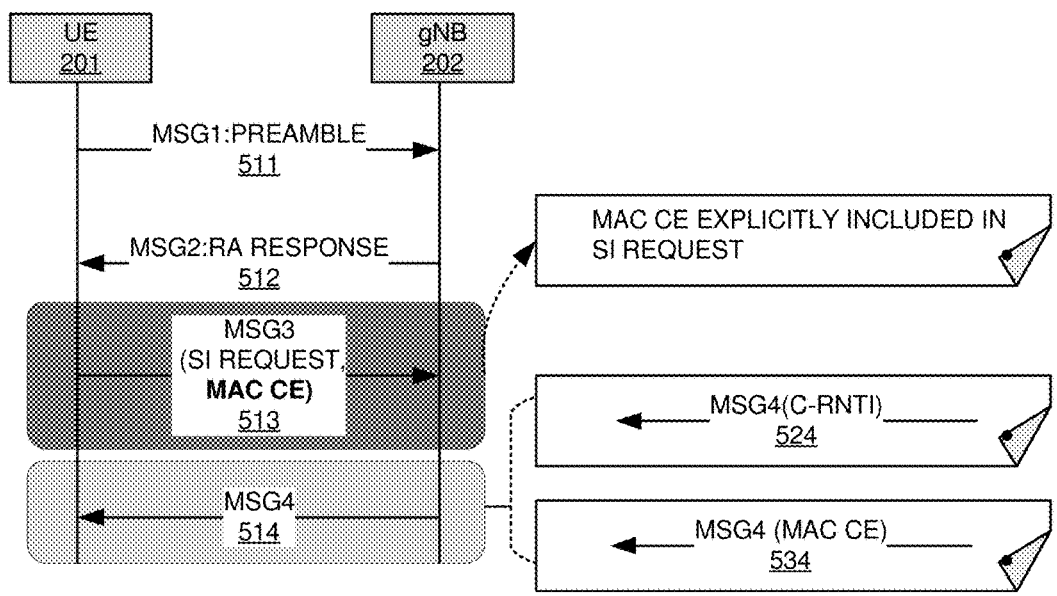
FIG. 5

ON-DEMAND SYSTEM INFORMATION REQUEST MESSAGE

CROSS REFERENCE TO RELATED APPLICATIONS

This application claims priority under 35 U.S.C. § 119 from U.S. Provisional Application No. 62/475,990 entitled "Design of On-demand System Information Request Message" filed on Mar. 24, 2017, the subject matters of which are incorporated herein by reference.

TECHNICAL FIELD

The disclosed embodiments relate generally to wireless communication, and, more particularly, to on-demand system request message.

BACKGROUND

In the legacy Long Term Evolution (LTE) mobile telecommunication systems procedure for system information (SI) change notification and system information broadcast schemes have been well designed for use equipment (UE) to be informed of system information change and update UE stored system information. However, in the 5G system information is classified into two categories, the minimum SI (MSI) and other SI (OSI). The former is the most essential system information, such as the system information related to cell access, while the latter is the SI which is not included in minimum SI. Some of OSI may be periodically broadcasted the same way as in the LTE, and some of OSI may be delivered on demand, which is called the on-demand OSI. The on-demand OSI is not periodically broadcasted by the 5G base station called the gNB. Instead, the gNB provides on-demand SI when required. The gNB could proactively provide on-demand SI for some UEs in need. The gNB could reactively transmit on-demand SI when the gNB detects UEs' request on certain on-demand OSI.

The objective to have on-demand SI delivery is to enhance legacy approach to SI delivery. In the legacy LTE, system information is always broadcasted periodically. Periodically broadcasted system information causes periodic inter-cell interference, and thus limits the density of cell deployment. In addition, periodic broadcast reduces radio resource utilization since the gNB always broadcasts all system information even if there is no UE in the cell or even if some system information is not needed by any UE in the cell. Furthermore, periodically broadcasted system information is not good to discontinuous transmission (DTX) since the gNB always needs to do periodic broadcast. It is, therefore, desired to deliver on-demand OSI only when they are needed by some UEs to reduce unnecessary SI transmission.

Improvements and enhancements are required for on-demand system information delivery.

SUMMARY

Apparatus and methods are provided for on-demand system information (SI) request procedure. In one novel aspect, the RACH procedure is used for one-demand SI information updates through unicast. In one embodiment, the UE performs a RACH procedure by sending a Msg1 with a preamble and receiving a Msg2 as the RA response. The UE sends an embedded SI request message in Msg3 requesting one or more on-demand SI. The SI request message includes a UE ID. The UE receives the SI response message which is embedded in Msg4. In one embodiment, the UE ID in the SI request is determined based on a UE state. The UE ID is a MAC control element (CE) for cell network temporary identifier (C-RNTI) when the UE state is radio resource control (RRC) connected, and the UE ID is a resumeID when the UE state is inactive, and the UE ID is SAE temporary mobile subscriber identifier (S-TMSI) or random-Value when the UE state is idle. In one embodiment, the SI response and the information of the requested SI are included in the Msg4. In another embodiment, Msg4 only includes the SI response. A unicasted message, which is transmitted separately from Msg4 includes the update SI information of the requested SI. In another embodiment, one or more assistant information is included in Msg3. The assistant information includes UE mobility information and UE SI version number. In yet another embodiment, the preamble of Msg1 is associated with one or more assistant information.

In another novel aspect, the SI broadcast is used upon the failure of the SI Request message in Msg3. In one embodiment, the preamble of the Msg1 is associated with a group X of SIB. The UE sends a Msg3 with the embedded SI request requesting a subset of SIB in group X. Upon detecting the failure of transmission of Msg3, the UE monitors and receives updated SI information of the whole group X through a broadcast channel.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4A illustrates an exemplary diagram of UE SI version number being included in the SI request message in accordance with embodiments of the current invention.

FIG. 4B illustrates an exemplary diagram of UE mobility information being included in the SI request message in accordance with embodiments of the current invention.

FIG. 5 illustrates an exemplary diagram of SI request includes the UE ID with the UE-specific SI response in accordance with embodiments of the current invention.

DETAILED DESCRIPTION

Reference will now be made in detail to some embodiments of the invention, examples of which are illustrated in the accompanying drawings.

Figure 1:
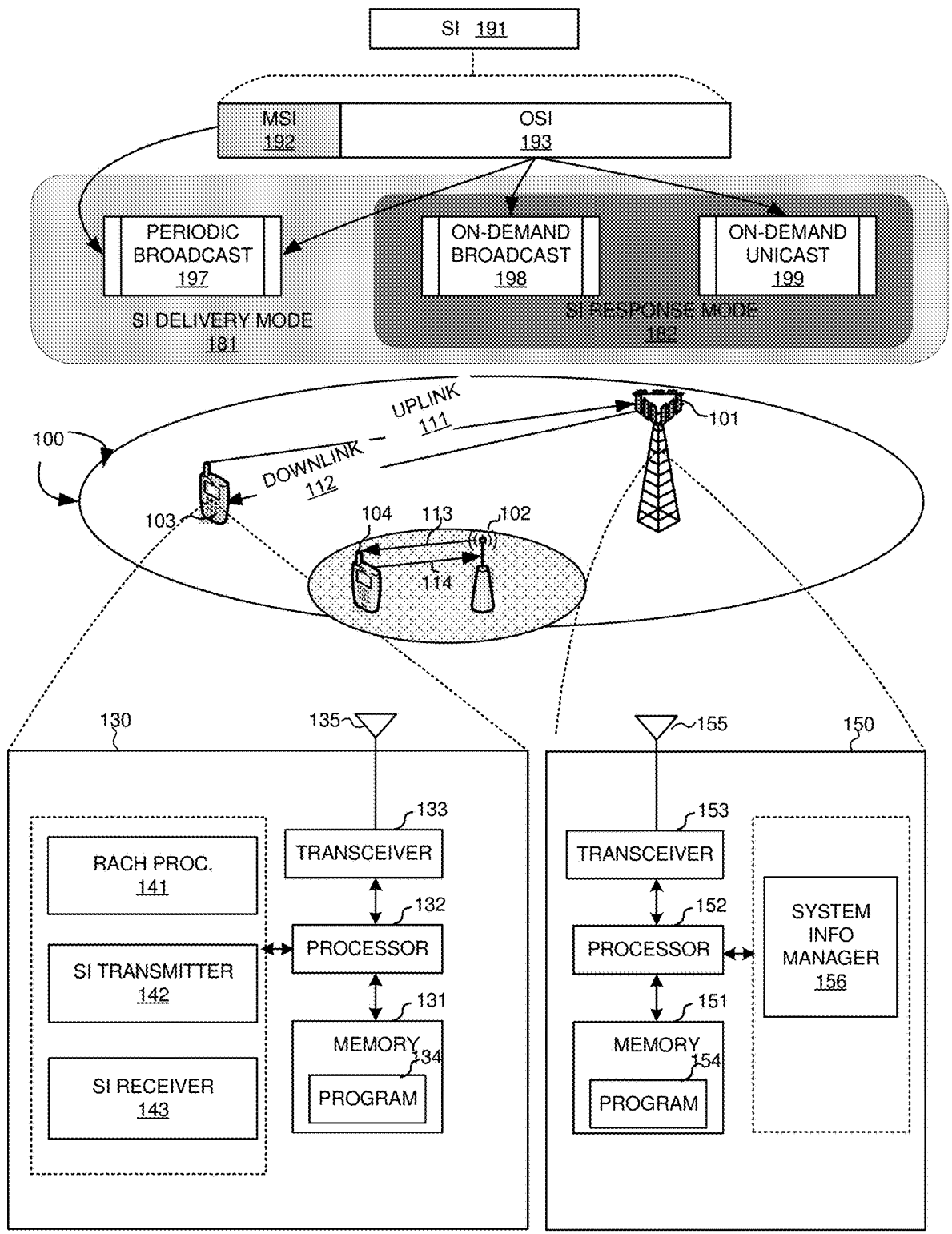
FIG. 1 is a schematic system diagram illustrating an exemplary on-demand SI delivery in accordance with embodiments of the current invention.

FIG. 1 is a schematic system diagram illustrating an exemplary on-demand SI delivery in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. In FIG. 1, the one or more base stations 101 and 102 serve several remote units/user equipment (UEs) 103 and 104 within a serving area, for example, a cell, or within a cell sector. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 112 and 113 to UEs or mobile stations in the time and/or frequency domain. UEs or mobile stations 103 and 104 communicate with one or more base stations 101 and 102 via uplink communication signals 111 and 114. UE or the mobile station may also be referred to as a mobile phone, laptop, and mobile workstation and so on. In FIG. 1, the wireless communication system 100 is an OFDM/OFDMA system comprising a base station gNB 101 gNB 102 and a plurality of UE 103 and UE 104. When there is a downlink packet to be sent from the gNB to the UE, each UE gets a downlink assignment, e.g., a set of radio resources in a physical downlink shared channel (PDSCH). When a UE needs to send a packet to gNB in the uplink, the UE gets a grant from the gNB that assigns a physical uplink shared channel (PUSCH) consisting of a set of uplink radio resources. In LTE, system information is updated on a per modification period basis. The system information broadcasted in the same modification period is the same. When the network changes one or more system information, it first notifies the UEs about this change. The notification may be done throughout a modification period. The UE expects to receive the updated system information in the start of the next modification period. In the 5G network, the feature of on-demand SI acquisition is supported.

FIG. 1 further illustrates simplified block diagrams 130 and 150 for UE 103 and gNB 101, respectively. UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in UE 103. Memory 131 stores program instructions and data 134 to control the operations of UE 103.

UE 103 also includes multiple function modules that carry out different tasks in accordance with embodiments of the current invention. A RACH procedure circuit 141 sends a Msg1 with a preamble and receives a Msg2 as a random access response. An SI transmitter 142 sends an SI request message requesting one or more other on-demand SI, embedded in a first RACH procedure message selecting from a first RACH message group comprising Msg1 and Msg3, wherein the RACH message includes a UE identification (ID) of the UE. An SI receiver 143 receives an SI response embedded in a second RACH procedure message selecting from a second RACH message comprising Msg2 and Msg4 from the network.

Also shown in FIG. 1 is exemplary block diagram for gNB 101. gNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in gNB 101. Memory 151 stores program instructions and data 154 to control the operations of gNB 101. gNB 101 also includes function modules that carry out different tasks in accordance with embodiments of the current invention. A system information manager 156 performs functions to support on-demand system information delivery functions.

In one novel aspect, the delivery method of the SI is indicated to the UE either in the MSI or in the SI change notification. The UE obtains SI based on the delivery method indicated in the MSI or the SI change notification message. In one embodiment, an indicator is included in the MSI to indicate whether the SI is delivered by broadcast or unicast. The broadcast delivery can be either a periodical broadcast or an on-demand broadcast. If the UE detects that the one or more SI is delivered by unicast, the UE sends SI request for the SI. Otherwise, if the UE detects that the SI is delivered by broadcast, it will look for the broadcast window to acquire the SI update.

FIG. 1 illustrates a system information delivery mode 181 and response mode 182. SI 191 includes a MSI 192 and one or more OSI 193. There are three types of SI delivery method, the periodic broadcast 197, on-demand broadcast 198 and on-demand unicast 199. In the 5G network, MSI 192 are delivered by periodic broadcast. Some of OSI are configured to be delivered using periodic broadcast, some of the OSI are configured to be delivered using on-demand broadcast, and some of the OSI are configured to be delivered using on-demand unicast. SI response mode indicates how network responds to SI request. When another SI is on-demand unicast, the UE sends SI request. Upon receiving the SI request, the network may provide SI with broadcast, in which case, the network changes the deliver mode from on-demand unicast to on-demand broadcast. Alternatively, the network unicasts the on-demand SI.

Figure 2:
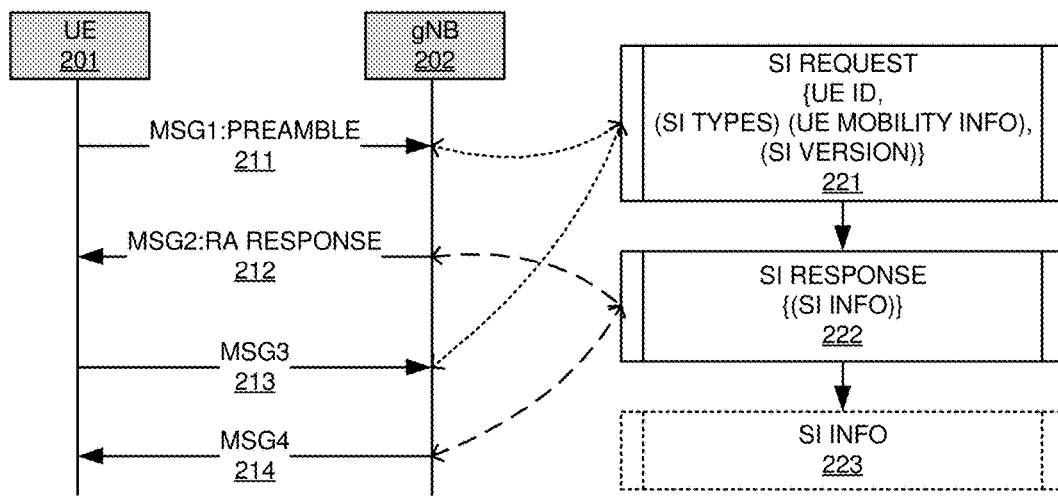
FIG. 2 illustrates an exemplary diagram of using the RACH procedure for on-demand SI unicast in accordance with embodiments of the current invention.

FIG. 2 illustrates an exemplary diagram of using the RACH procedure for on-demand SI unicast in accordance with embodiments of the current invention. A UE 201 communicates with a gNB 202 in a wireless network. In one novel aspect, the UE performs a SI unicast update using the random access channel (RACH) procedure. In a RACH procedure, at step 211, UE 201 sends Msg1 with a preamble. At step 212, gNB 202 sends Msg2 as a response to Msg1. At step 213, UE 201 sends Msg3 with the resource granted in Msg2. At step 214, gNB 202 send Msg4 as an ACK to the Msg3. In one embodiment, Msg3 and Msg4 are used for SI unicast procedure. In one embodiment, Msg3 embeds a SI request message. Msg3 also includes the UE ID of UE 201. SI response message is embedded in Msg4. In another embodiment, two-spec RACH procedure is used for SI unicast update. In one embodiment, Msg1 is used to serve as the SI request. In one embodiment, the SI request message 221 is embedded in Msg1 with the preamble. Msg2 responds with embedded SI response. In another embodiment, both the SI response and the content of the requested SI are included in Msg2 together. The SI unicast uses the RACH procedure with either a four-step procedure or a two-step procedure as illustrated above. In both of the four-step and two-step procedures, the SI request message 221 includes an UE ID, and optionally includes SI types/groups requested, the UE mobility information, and the UE SI version number. In one embodiment, the SI response 222 embedded with the RACH message, either Msg2 or Msg4, includes the SI information of the requested on-demand SIs. In another embodiment, the SI response 222 embedded with Msg4, does not include the SI information of the requested on-demand SIs. A unicast message 223 with the SI information of the requested on-demand SIs is received following Msg4.

Msg3 Based SI Request for Unicast

Figure 3:
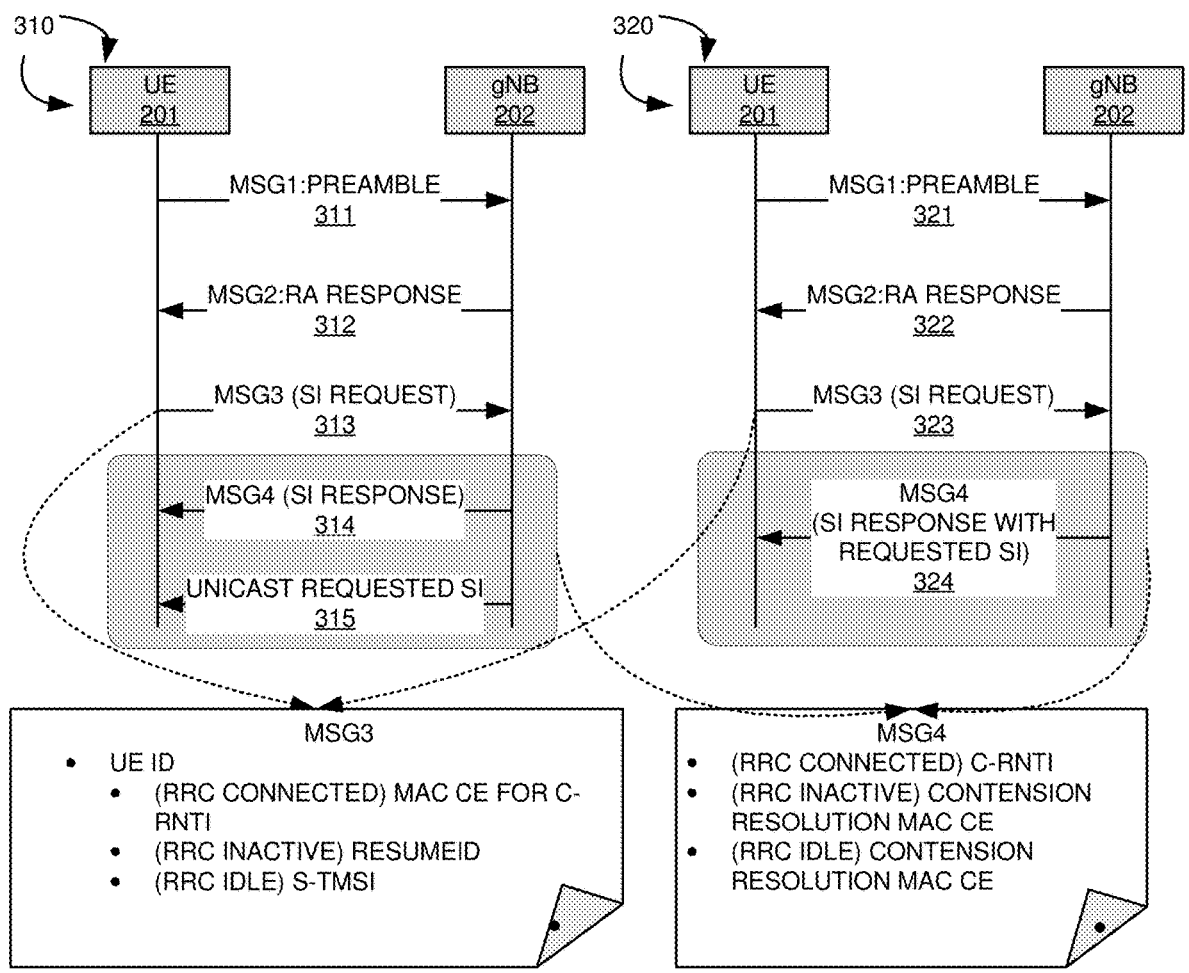
FIG. 3 illustrates an exemplary diagram for a Msg3 based SI request unicast procedure in accordance to embodiments of the current invention.

FIG. 3 illustrates an exemplary diagram for a Msg3 based SI request unicast procedure in accordance to embodiments of the current invention. In one embodiment, the SI information is embedded in Msg4. In another embodiment, the SI information is unicasted to the UE separately from Msg4. A UE 201 communicates with gNB 202 in a wireless network. A procedure 310 illustrates the SI information delivered in a separate unicast message. At step 311, UE 201 sends Msg1 with the preamble. At step 312, gNB 202 sends Msg2 as the RA response to UE 201. At step 313, UE 201 sends Msg3 after receiving Msg2. The SI request embeds in the Msg3. At step 314, gNB 202 sends the Msg4 with SI response embedded. At step 315, the requested SI information is unicasted to UE 201. A procedure 320 illustrates an exemplary flow chart of the SI information embedded in Msg4. Similar to procedure 310, UE 201 and gNB 202 exchanges Msg1 and Msg2 for RACH procedure. At step 323, UE 201 sends the SI request in Msg3 to gNB 202. At step 324, gNB 202 sends Msg4 to UE 201. Msg4 embeds the SI response and the requested SI information. In both procedure 310 and procedure 320, the Msg3 with SI request includes an UE ID of UE 201. In one embodiment, UE 201 supplies different UE ID based the UE state. When UE 201 is in the UE connected state, the UE ID in Msg3 is the MAC control element (CE) for cell radio network temporary identifier (C-RNTI), which is the same as the UE ID for the RACH procedure as defined in LTE. When UE 201 is in the inactive state, the UE ID is set to the resumeID, which is included the RRC SI request message. When UE 201 is in the idle state, the UE ID can be set to system architecture evolution (SAE) temporary mobile subscriber identifier (S-TMSI). In one embodiment, in response to the Msg3 with SI request, gNB 202 sends a UE-specific SI response in Msg4. If MAC CE for C-RNTI is included in Msg3, physical downlink control channel (PDCCH) for Msg4 is addressed to the C-RNTI. Otherwise, PDCCH in Msg4 is addressed to the temporary C-RNTI as provided in Msg2 and use connection resolution MAC CE in Msg4 to identify the UE in the idle state or the RRC inactive state.

In one embodiment, one or more assistant information is included in the RACH messages together with the SI request. FIGS. 4A and 4B illustrates exemplary embodiments of assistant information for the on-demand SI information delivery. The assistant information can be sent alone with the SI request or more than one assistant information can be combined and sent with the SI request message.

FIG. 4A illustrates an exemplary diagram of UE SI version number being included in the SI request message in accordance with embodiments of the current invention. UE 201 communicates with gNB 202 in the wireless network. At step 411, UE 201 sends Msg1 with the preamble to gNB 202. At step 412, gNB 202 replies with Msg2 to UE 201 as the RA response. At step 413, UE 201 sends Msg3 embedded with SI request to gNB 202. In one embodiment, the SI request message also includes assistant information, such as the UE stored SI version number, such as a value tag and/or a system information area ID. The UE SI version number is stored in UE 201 and identifies the current SIB types and status of the on-demand SI. Other type of information, which identifies the status of UE on-demand SI can be used as the assistant information. At step 414, gNB 202 replies with Msg4 embedded with SI response. With the status of UE stored system information, the network can do optimization. In one embodiment, the network provides the delta update based on the current stored version of UE 201. The network compares the current SI status with the SI status stored in UE 201 and only includes the SI information that has been changed in the SI update message. In another embodiment, based on the received UE SI version number, the network may provide additional version that is not currently stored in UE 201 but may be needed soon. At step 414, gNB 202 sends Msg4 with the SI response to UE 201. The updated SI information may be included together with SI response. In another embodiment, the updated SI information may be unicasted to UE 202 in a separate message following Msg4.

FIG. 4B illustrates an exemplary diagram of UE mobility information being included in the SI request message in accordance with embodiments of the current invention. At step 421, UE 201 sends Msg1 with the preamble to gNB 202. At step 422, gNB 202 replies with Msg2 to UE 201 as the RA response. At step 423, UE 201 sends Msg3 embedded with SI request to gNB 202. In one embodiment, the SI request message also includes assistant information, such as UE mobility information. In one embodiment, the UE mobility information is the UE mobility status as specified in the LTE specification. The network upon receiving the UE mobility information, can optimize the SI delivery. In one embodiment, based on the UE mobility status, the network can selectively provide UE with the system information applied by one or more neighboring cells in the SI update. The UE can acquire possible handover candidate neighboring cell SI information before it camps on the neighboring cells and thus reduces SI acquisition time during handover. At step 424, gNB 202 sends Msg4 with the SI response to UE 201. The updated SI information may be included together with SI response. In another embodiment, the updated SI information may be unicasted to UE 202 in a separate message following Msg4.

FIG. 5 illustrates an exemplary diagram of SI request includes the UE ID with the UE-specific SI response in accordance with embodiments of the current invention. UE 201 communicates with gNB 202. At step 511, UE 201 sends Msg1 with the preamble to gNB 202. At step 512, gNB 202 replies with Msg2 to UE 201 as the RA response. At step 513, UE 201 sends Msg3 embedded with SI request to gNB 202. In one embodiment, MAC CE for C-RNTI is explicitly included in the SI request message. In response, the Msg4 has two options. In the first embodiment, Msg4 524 includes no physical downlink shared channel (PDSCH) content for MAC PDU. PDSCH of Msg4 524 address C-RNTI as the acknowledge of Msg3 reception. In another embodiment, Msg4 534 includes a MAC CE for SI request confirmation, which also serves as the ACK for the reception of Msg3. At step 514, gNB 202 sends Msg4 with the UE-specific SI response to UE 201.

In one embodiment, the assistant information illustrated above can be sent in Msg1 with association of the preamble. In other embodiments, the preamble in Msg1 can be associated with other information, such the one or more SI groups requested for the SI delivery procedure.

Figure 6:
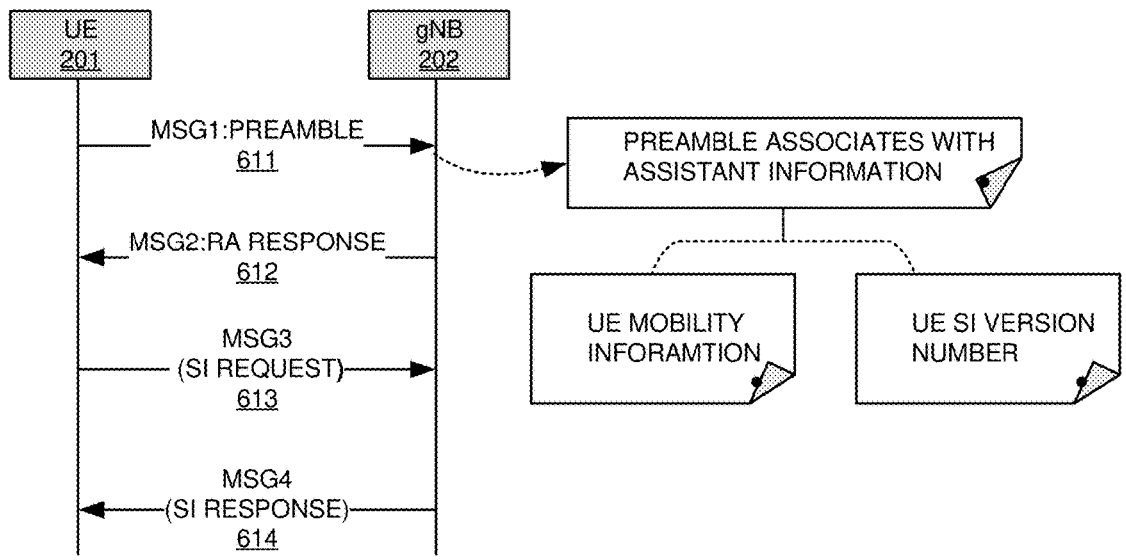
FIG. 6 illustrates exemplary diagrams of the preamble associates with one or more assistant information in accordance with embodiments of the current invention.

FIG. 6 illustrates exemplary diagrams of the preamble associates with one or more assistant information in accordance with embodiments of the current invention. UE 201 communicates with gNB 202. At step 611, UE 201 sends Msg1 with the preamble to gNB 202. In one embodiment, the preamble is specifically selected to indicate one or more assistant information for the SI update procedure. The assistant information may include the UE mobility information and the UE SI version number. One or more preamble is predefined to be associated with the assistant information. Other assistant information may also be included by assigning the preamble to the specified assistant information. At step 612, gNB 202 replies with Msg2 to UE 201 as the RA response. At step 613, UE 201 sends Msg3 embedded with SI request to gNB 202. At step 614, gNB 202 sends Msg4 with SI response to UE 201. In one embodiment, the network optimize the SI update message based on the preamble, which carries one or more assistant information.

Figure 7:
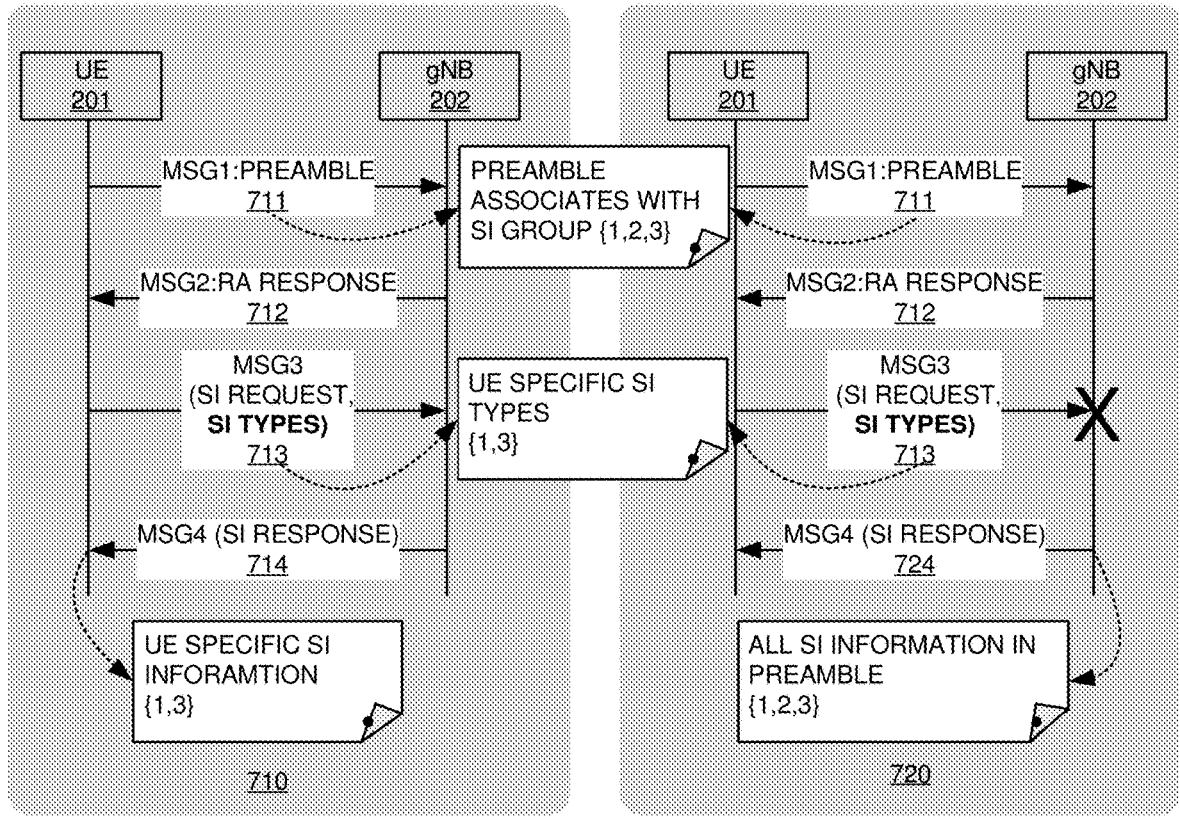
FIG. 7 illustrates exemplary diagrams of the preamble associates with one or more SI group in accordance with embodiments of the current invention.

FIG. 7 illustrates exemplary diagrams of the preamble associates with one or more SI group in accordance with embodiments of the current invention. In one embodiment, the preamble in Msg1 is set to be associated with one or more SI groups. The SI request in Msg3 may further specify a subset of the SI groups requested. In one embodiment, as illustrated by procedure 710, the Msg3 is decoded successfully by the network and the SI update includes the SI groups specified in Msg3. In another embodiment, as illustrated by procedure 720, when the network fails to decode the Msg3, all the SI groups indicated by the preamble in Msg1 is sent by the network.

UE 201 communicates with gNB 202. At step 711, UE 201 sends Msg1 with the preamble to gNB 202. The preamble in Msg1 is predefined and selected to indicate a SI group to be updated. For example, the preamble in Msg1 is associated with SI groups {1,2,3}. At step 712, gNB 202 replies with Msg2 to UE 201 as the RA response. At step 713, UE 201 sends Msg3 embedded with SI request to gNB 202. The SI request in Msg3 specifies a subset of SI groups as indicated by the preamble. For example, the SI request may indicate that SI groups {1,3} are requested. In one embodiment, the SI request may indicate the full set of SI group indicated by the preamble is requested. In one scenario, Msg3 is successfully decoded by the network. gNB 202 at step 714 sends Msg4 with SI response. The SI update message includes the SI groups as specified by the SI request in Msg3, such as SI group {1,3}. In another scenario, if RACH collision occurs, the network fails to decode Msg3 successfully. The network may decide to terminate Msg3 retransmission and sends all SIB associated with the preamble. gNB 202, at step 724 sends MSg4 with SI response, which may include the SI update for the SI group indicated by the preamble, such as SI groups {1,2,3}.

Two-Step RACH Procedure for SI Request

Figure 8:
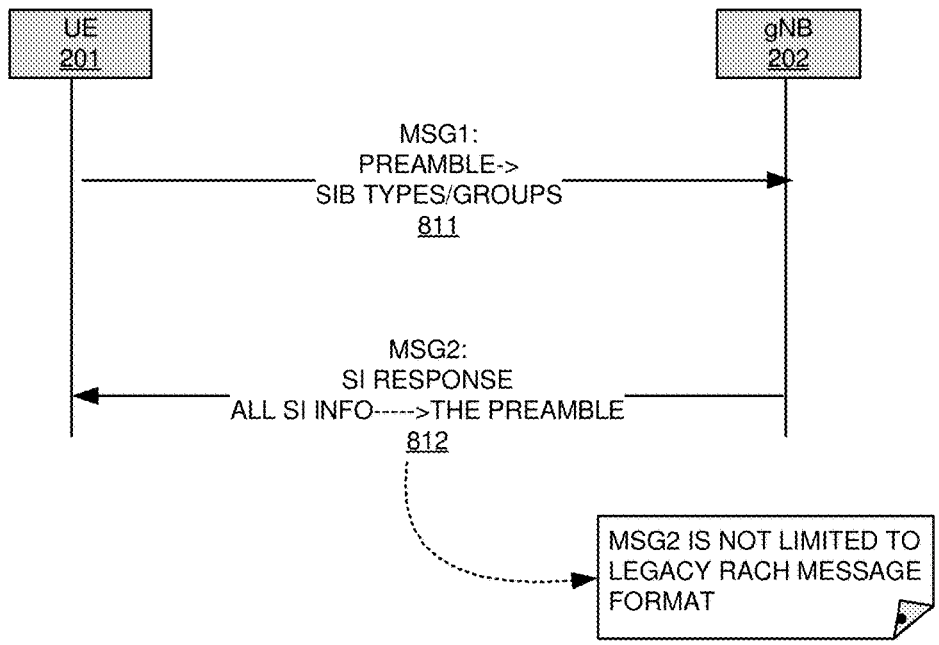
FIG. 8 illustrates an exemplary diagram of the two-step RACH procedure for the SI request with the preamble associated with one or more SIB requested.

In one novel aspect, two-step RACH procedure is sued for the SI request and SI delivery procedure. In one embodiment, the preamble in Msg1 is associated with one or more SI groups to serve as a SI request. In another embodiment, the SI request message is embedded in Msg1 for the two-step SI delivery FIG. 8 illustrates an exemplary diagram of the two-step RACH procedure for the SI request with the preamble associated with one or more SIB requested. In one embodiment, a simplified SI request procedure is used with the RACH preamble associated with one or more SIB types or groups. The network upon receiving Msg1 with the predefined preamble, send the requested SI in Msg2. The Msg2 is not limited to the format of Msg2 as defined in the legacy RACH procedure. The Msg2 includes information of all SIB types and groups associated with the preamble. UE 201 communicates with gNB 202. At step 811, UE 201 sends Msg1 with the preamble to gNB 202. The preamble in Msg1 is predefined and selected to indicate one more SIB types/groups for the SI update. Upon decoding the predefined preamble, the network sends the information of all the SIB types/groups associated with the preamble. At step 812, gNB 202 sends Msg2 to UE 201. Msg2 includes the SI response and all the SI information of the SIB types/groups associated with the preamble. The Msg2 is not limited to the legacy RACH message format.

Figure 9:
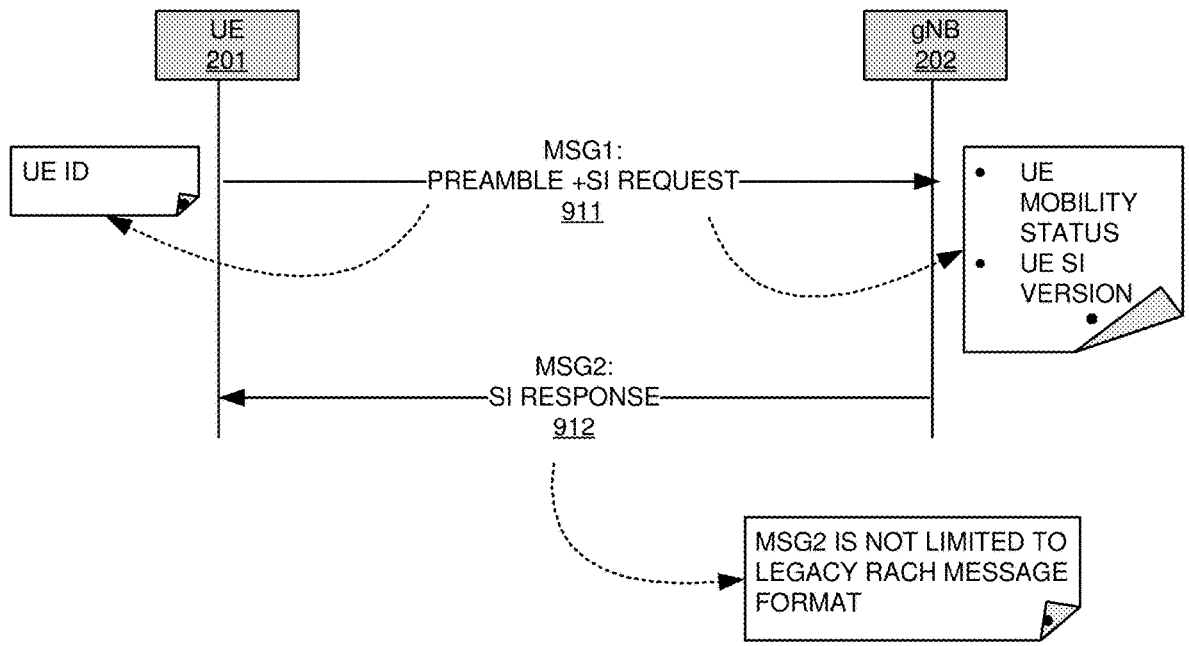
FIG. 9 illustrates an exemplary diagram of the two-step RACH procedure for the SI request with the SI request message embedded in Msg1.

FIG. 9 illustrates an exemplary diagram of the two-step RACH procedure for the SI request with the SI request message embedded in Msg1. UE 201 communicates with gNB 202. At step 911, UE 201 sends Msg1 with the preamble to gNB 202. Msg1 includes the SI request message for the one-demand SI update. The SI request message includes the UE ID. The UE ID can be the MAC CE for the connected state UE, or the resumeID for the inactive state UE, or the S-TMSI for the idle state UE. In one embodiment, the SI request message may also include assistant information for the SI update procedure. For example, the SI request message may include the UE mobility information. The SI request message may also include the stored UE SI version number. As described for the Msg3—based SI update procedure above, the network may optimize the SI update based on the assistant information. For example, the SI delta information may be sent in the SI response based on the UE SI version number. Based on the UE mobility information, one or more selected neighboring cells' SI information may be included in the SI response. At step 912, gNB 202 sends the SI response with information of all the SIB types/groups requested in the SI request.

SI Broadcast

In one novel aspect, SI broadcast is used when RACH collision causes the failure to decode Msg3. The UE upon detecting one or more triggering conditions, such a maximum number of Msg3 retransmission is reached or a predefined Msg3 timer expires, stops Msg3 retransmission. The UE monitors an SI broadcast to obtain the requested SI update.

Figure 10A:
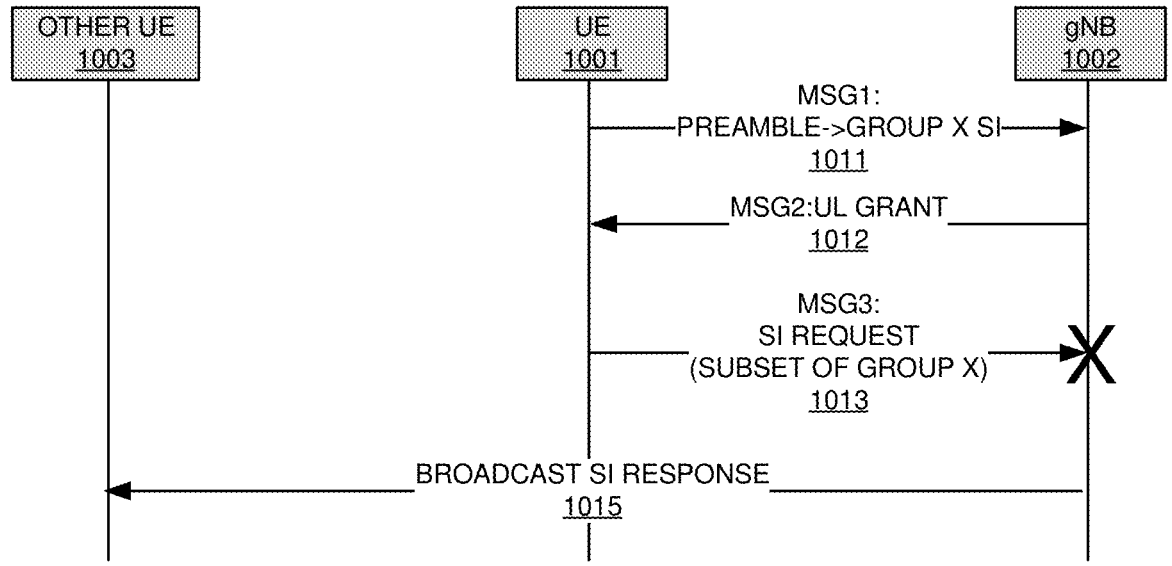
FIG. 10A illustrates an exemplary diagram of the SI broadcast procedure upon detecting failure of Msg3 in accordance with embodiments of the current invention.

FIG. 10A illustrates an exemplary diagram of the SI broadcast procedure upon detecting failure of Msg3 in accordance with embodiments of the current invention. UE 1001 communicates with gNB 1002. At step 1011, UE 1001 sends Msg1 with the preamble to gNB 1002. The preamble in Msg1 is predefined and selected to indicate a group X of SIB to be updated. At step 1012, gNB 1002 replies with Msg2 to UE 1001 as the RA response. At step 1013, UE 1001 sends Msg3 embedded with SI request to gNB 1002. The SI request in Msg3 specifies a subset of SIB as indicated by the preamble. In one embodiment, the SI request may indicate the full set of SI group indicated by the preamble is requested. The network may not be able to decode Msg3 successfully due to RACH collision or other channel conditions. If the network fails to decode Msg3 and the timer for Msg3 expired, or the maximum number of retry is reached for Msg3, gNB 1002 will not expect more Msg3 from UE 1001. gNB 1002 will not allocate further resource for Msg3 retransmission. gNB 1002, at step 1015 broadcasts information of all SIBs in group X as indicated by the preamble. Upon detecting failure to receive ACK for the Msg3 transmission and retransmission, UE 1001 stops retransmission of Msg3 for SI request. UE 1001 monitors an SI broadcast channel and receives the SI update by the SI broadcast.

Figure 10B:
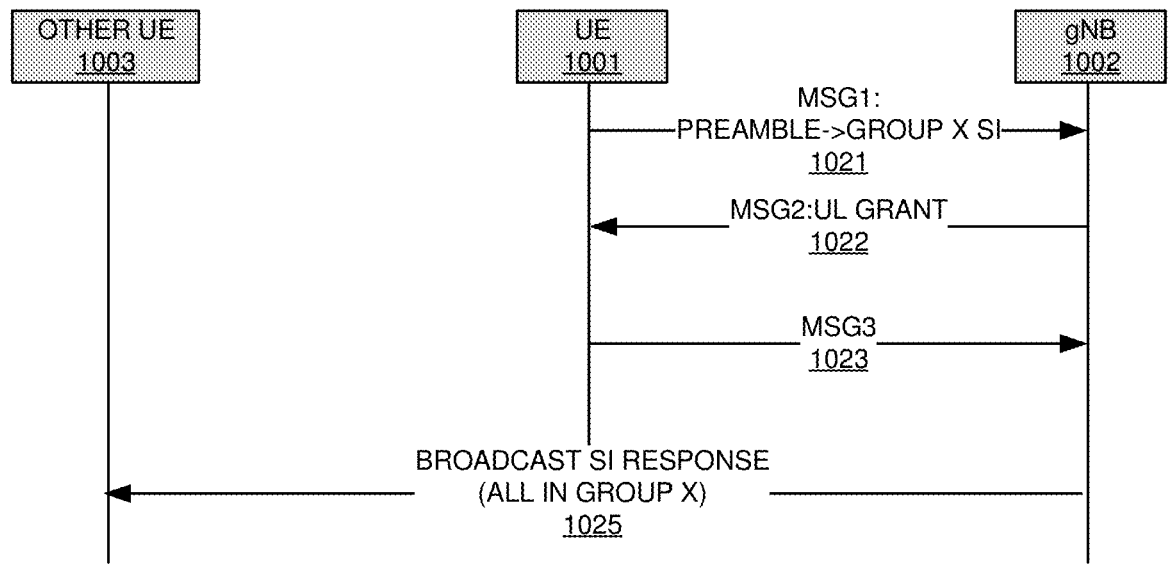
FIG. 10B illustrates an exemplary diagram of the SI broadcast procedure upon sending Msg3 in accordance with embodiments of the current invention.

FIG. 10B illustrates an exemplary diagram of the SI broadcast procedure upon sending Msg3 in accordance with embodiments of the current invention. In another embodiment, UE start to monitors an SI broadcast channel upon the first Msg3 transmission. In this way, network can determine to broadcast all the SIBs in group X when network wants, and there is no need for the UE and the network to maintain or configure timer or maximum number of Msg3 transmission for SI request. UE 1001 communicates with gNB 1002. At step 1021, UE 1001 sends Msg1 with the preamble to gNB 1002. The preamble in Msg1 is predefined and selected to indicate a group X of SIB to be updated. At step 1022, gNB 1002 replies with Msg2 to UE 1001 as the RA response. At step 1023, UE 1001 sends Msg3. Upon sending the Msg3, UE 1001 starts to monitor the SI broadcast channel. At step 1025, gNB 1002 sends SI broadcast message for all the SI in Group X as indicated by the preamble in Msg1.

Figure 10C:
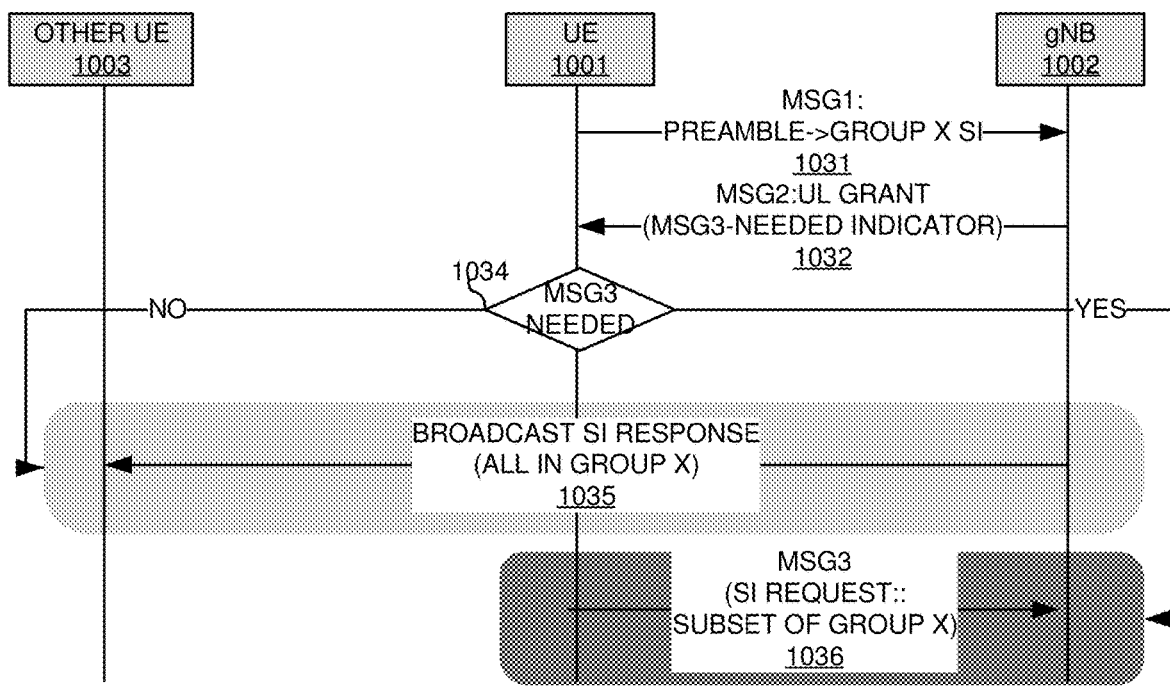
FIG. 10C illustrates an exemplary diagram of SI broadcast if the Msg2 indicates no Msg3 needed in accordance with embodiments of the current invention.

FIG. 10C illustrates an exemplary diagram of SI broadcast if the Msg2 indicates no Msg3 needed in accordance with embodiments of the current invention. In another embodiment, the network indicates in Msg2 whether UE needs to send Msg3. If the indication is yes, UE send Msg3 to indicate the subset of SIBs in group X to be requested; otherwise, UE considers its SI request successful, and monitor broadcast channel to receive the requested SIBs in group X. After sending Msg 2 to the UE, network broadcast all SIBs in group X. UE 1001 communicates with gNB 1002. At step 1031, UE 1001 sends Msg1 with the preamble to gNB 1002. The preamble in Msg1 is predefined and selected to indicate a group X of SIB to be updated. At step 1032, gNB 1002 replies with Msg2 to UE 1001 as the RA response. Msg2 includes a broadcast indicator, which indicates whether a Msg3 is needed for the SI update. At step 1034, UE 1001 decodes Msg2 and determines whether Msg3 is needed based on the broadcast indicator. If step 1034 determines no, UE 1001 starts to monitor a broadcast channel. gNB 1002, at step 1035, broadcast the SI information for the SIs in group X as indicated by the preamble in Msg1. If step 1034 determines yes, at step 1036, UE 1001 sends Msg3 with a subset of group X.

Figure 11A:
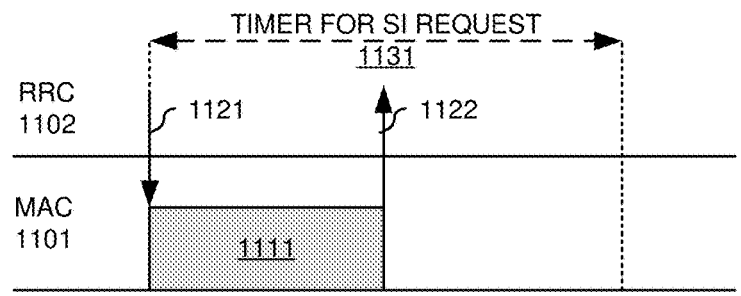
FIG. 11A illustrates exemplary diagrams of determining a failure of Msg3 transmission by the MAC layer in accordance with embodiments of the current invention.

FIG. 11A illustrates exemplary diagrams of determining a failure of Msg3 transmission by the MAC layer in accordance with embodiments of the current invention. A MAC layer 1101 communicates with one of its upper layers, RRC layer 1102. A RACH procedure 1111 starts when receiving an upper layer message 1121. A timer 1131 for SI request starts upon receiving upper layer message or indication 1121. RACH 1111 also passing message blocks to upper layer 1102 through communication 1122. MAC layer 1101 determines whether the SI request is successful. MAC layer 1101 indicates the reception of an ACK at 1122 if RACH procedure 1111 is successful. If the timer for SI request transmission in Msg3 expires or if the maximum number of Msg3 transmission is for SI request reached without receiving an ACK, MAC layer 1101 stops the RACH procedure and determines that the RACH procedure is failed. However, MAC layer still indicates successful SI request to RRC layer because network will broadcast all SIBs in group X after failed Msg3 transmission, and thus all the requested SIBs in group X will anyway be broadcast. MAC layer can indicate successful SI request to RRC layer after successful Msg3 transmission, e.g., upon successful reception of Msg2, upon failed Msg3 transmission, or upon successful or unsuccessful RACH procedure completion.

Figure 11B:
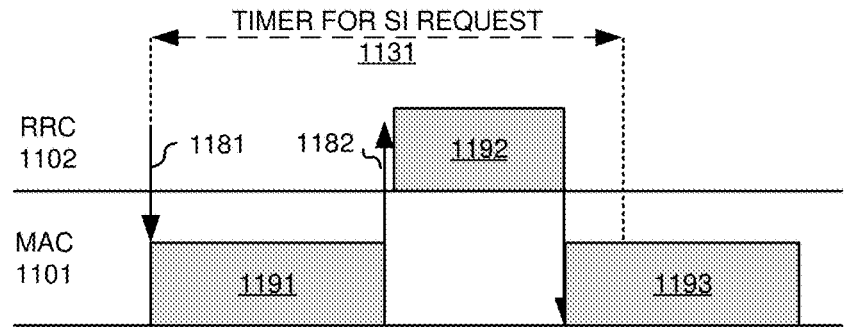
FIG. 11B illustrates exemplary diagrams of determining a failure of Msg3 transmission by the RRC layer in accordance with embodiments of the current invention.

FIG. 11B illustrates exemplary diagrams of determining a failure of Msg3 transmission by the RRC layer in accordance with embodiments of the current invention. A MAC layer 1101 communicates with one of its upper layers, RRC layer 1102. A RACH procedure 1191 starts when receiving an upper layer message or indication 1181. A timer 1131 for SI request starts upon receiving upper layer message or indication 1181. RACH 1191, at step 1182, delivers the decoded MAC PDU to RRC layer 1102 if the RACH procedure is successful. A RRC layer procedure 1192 checks the Msg4 contents and determines if the SI request is successful. If the previous Msg4 is received but not all the required SI is to be broadcasted determined by the RRC layer, RRC layer considers the SI request failed. A new RACH procedure 1193 for SI request is initialized for the missing SI.

Figure 12:
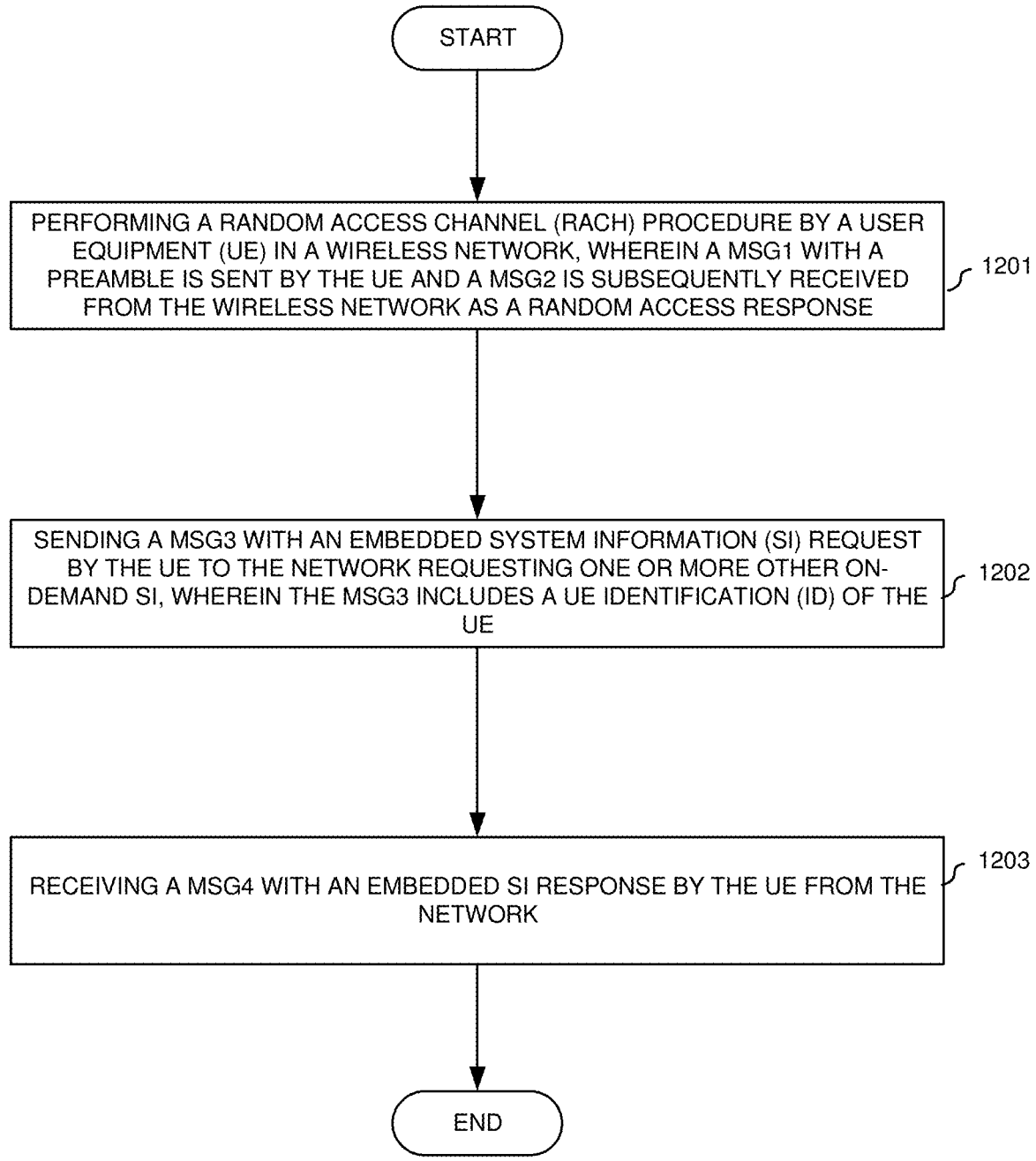
FIG. 12 illustrates an exemplary flow chart of the SI request message for SI unicast procedure using the RACH procedure in accordance with embodiments of the current invention.

FIG. 12 illustrates an exemplary flow chart of the SI request message for SI unicast procedure using the RACH procedure in accordance with embodiments of the current invention. At step 1201, the UE performs a RACH procedure by in a wireless network, wherein a Msg1 with a preamble is sent by the UE and a Msg2 is subsequently received from the wireless network as a random access response. At step 1202, the UE sends a Msg3 with an embedded system information (SI) request by the UE to the network requesting one or more other on-demand SI, wherein the Msg3 includes a UE ID of the UE. At step 1203, the UE receives a Msg4 with an embedded SI response by the UE from the network.

Figure 13:
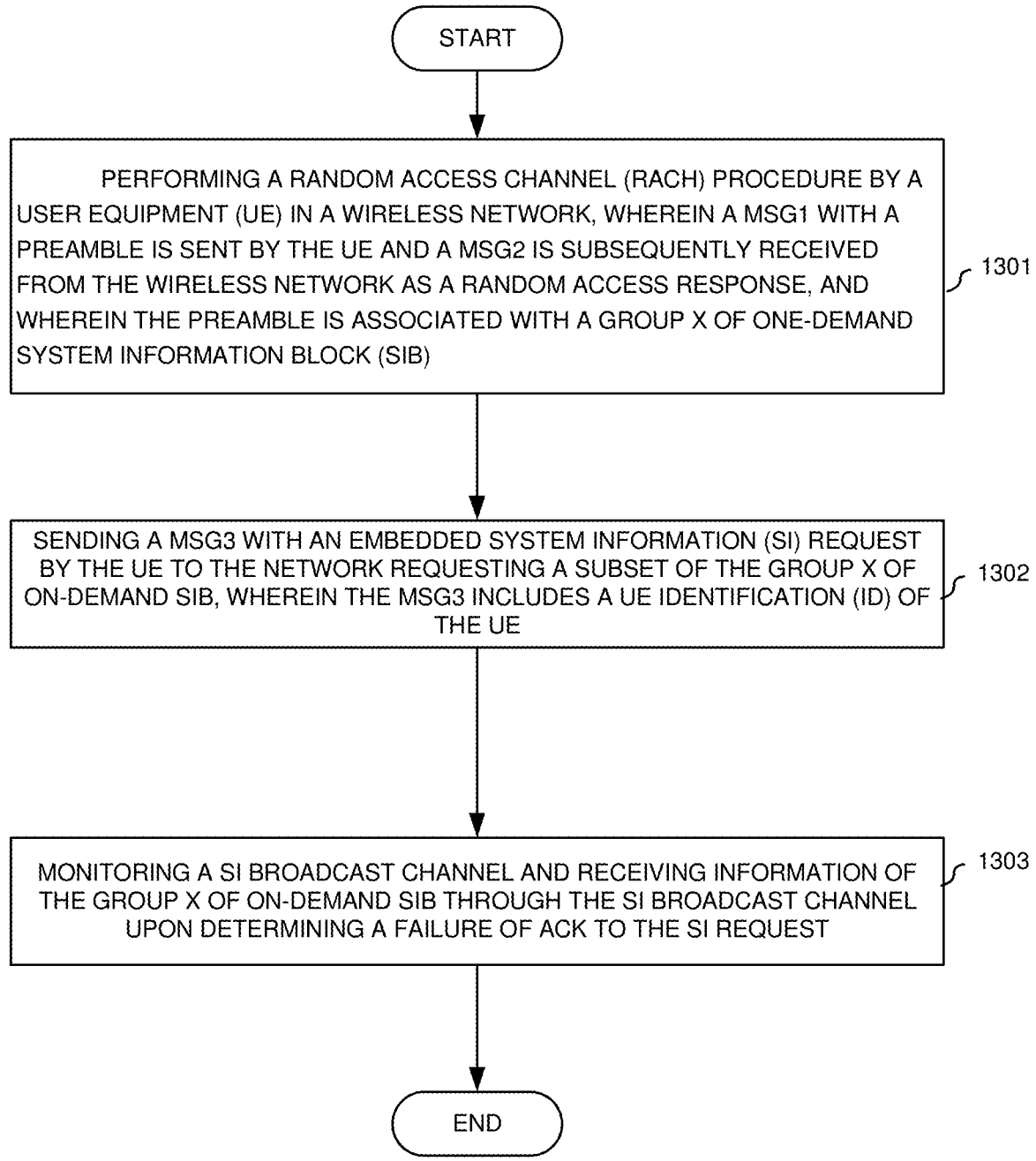
FIG. 13 illustrates an exemplary flow chart of the SI broadcast procedure upon detecting failure of Msg3 in accordance with embodiments of the current invention.

FIG. 13 illustrates an exemplary flow chart of the SI broadcast procedure upon detecting failure of Msg3 in accordance with embodiments of the current invention. At step 1301, the UE performs a RACH procedure in a wireless network, wherein a Msg1 with a preamble is sent by the UE and a Msg2 is subsequently received from the wireless network as a random access response, and wherein the preamble is associated with a group X of one-demand system information block (SIB). At step 1302, the UE sends a Msg3 with an embedded SI request by the UE to the network requesting a subset of the group X of on-demand SIB, wherein the Msg3 includes a UE ID of the UE. At step 1303, the UE monitors a SI broadcast channel and receiving information of the group X of on-demand SIB through the SI broadcast channel upon determining a failure of ACK to the SI request.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
performing a random access channel (RACH) procedure by a user equipment (UE) in a wireless network, wherein a Msg1 with a preamble is sent by the UE and a Msg2 is subsequently received from the wireless network as a random access response;
sending a Msg3 with an embedded system information (SI) request by the UE to the network requesting one or more other on-demand SI, wherein the Msg3 includes a UE identification (ID) of the UE, and wherein the UE ID in the SI request is determined based on a UE state, and wherein the UE state is one of a radio resource control (RRC) connected state, an inactive state, and an idle state;
receiving a Msg4 with an embedded SI response by the UE from the network; and
receiving an unicasted message following the SI response by the UE from the network, wherein information of the one or more on-demand SI requested are included.

2. The method of claim 1, wherein the UE ID is a MAC control element (CE) for cell network temporary identifier (C-RNTI) when the UE state is radio resource control (RRC) connected.

3. The method of claim 1, wherein the Msg4 further includes the one or more requested on-demand SI.

4. The method of claim 1, wherein the SI response includes one or more SI versions of one or more neighboring cells based on the UE mobility information.

5. The method of claim 1, wherein Msg3 further includes the stored SI version number of the UE.

6. The method of claim 5, wherein the UE receives one or more optimized update comprising: delta information of one or more on-demand SI based on the stored SI version number, and additional on-demand SI information not yet stored in the UE.

7. The method of claim 1, wherein the preamble is associated with one or more assistant information comprising: a set of on-demand SI types requested, the UE mobility information, and the UE stored SI version number.

8. The method of claim 7, wherein the preamble is associated with a set of on-demand SI types requested, and wherein the SI request further specifies a subset of on-demand SI types associated with the preamble, wherein information of the subset of on-demand SI is received if the network decodes the SI request correctly; otherwise, information of the set of on-demand SI types associated with the preamble is received.

9. A method comprising:
performing a random access channel (RACH) procedure by a user equipment (UE) in a wireless network, wherein a Msg1 with a preamble is sent by the UE and a Msg2 is subsequently received from the wireless network as a random access response, and wherein the preamble is associated with a dynamically assigned group X of on-demand system information block (SIB);
sending a Msg3 with an embedded system information (SI) request by the UE to the network requesting a subset of the group X of on-demand SIB, wherein the Msg3 includes a UE identification (ID) of the UE; and
monitoring a SI broadcast channel and receiving information of the group X of on-demand SIB through the SI broadcast channel upon determining a failure of ACK to the SI request.

10. The method of claim 9, wherein the failure of ACK to the SI request is determined based on one or more triggering conditions comprising: no ACK message is received before a timer expired, and a maximum number of Msg3 retransmission is reached.

11. The method of claim 10, wherein an ACK to the SI request is determined at a MAC layer, wherein the MAC layer indicate a reception of an ACK to the SI request to an upper layer if the RACH procedure is successful.

12. The method of 10, wherein an ACK to the SI request is determined at a radio resource control (RRC) layer.

13. An apparatus, comprising:
a transceiver that transmits and receives radio frequency (RF) signals from one or more base stations (BS) in wireless network;
a random access channel (RACH) procedure circuit that sends a Msg1 with a preamble and receives a Msg2 as a random access response;
a system information (SI) transmitter that sends a Msg3 with an SI request message requesting one or more other on-demand SI, wherein a RACH message includes a UE identification (ID) of the UE, and wherein the UE ID in the SI request is determined based on a UE state, and wherein the UE state is one of a radio resource control (RRC) connected state, an inactive state, and an idle state; and
an SI receiver that receives a Msg4 with an SI response embedded from the network and receives an unicasted message following the SI response by the UE from the network, wherein information of the one or more on-demand SI requested are included.

14. The apparatus of claim 13, wherein the UE ID is a MAC control element (CE) for cell network temporary identifier (C-RNTI) when the UE state is radio resource control (RRC) connected.

15. The apparatus of claim 14, wherein the Msg4 further includes information of the one or more requested on-demand SI.

16. The apparatus of claim 14, wherein the Msg3 further includes the stored SI version number of the UE.

17. The apparatus of claim 16, wherein the UE receives one or more optimized update comprising: delta information of one or more on-demand SI based on the stored SI version number, and additional on-demand SI information not yet stored in the UE.

18. The apparatus of claim 14, wherein the preamble is associated with one or more assistant information comprising: a set of on-demand SI types requested, the UE mobility information, and the UE stored SI version number.

19. The apparatus of claim 18, wherein the preamble is associated with a set of on-demand SI types requested, and wherein the SI request further specifies a subset of on-demand SI types associated with the preamble, wherein information of the subset of on-demand SI is received if the network decodes the SI request correctly; otherwise, information of the set of on-demand SI types associated with the preamble is received.

20. The apparatus of claim 13, wherein the SI response includes one or more SI versions of one or more neighboring cells based on the UE mobility information.

\* \* \* \* \*